United States Patent
Bot et al.

(10) Patent No.: US 10,560,570 B2
(45) Date of Patent: Feb. 11, 2020

(54) METHOD, SYSTEM AND DEVICE FOR PROVIDING A SETUP OF AN ENHANCED CALL VIA A WIRELESS LOCAL AREA NETWORK

(71) Applicant: Telefonaktiebolaget LM Ericsson (publ), Stockholm (SE)

(72) Inventors: Jan Bot, GV Nieuwendijk (NL); Fedor Maas, Molenschot (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/063,907

(22) PCT Filed: Dec. 30, 2015

(86) PCT No.: PCT/EP2015/081427
§ 371 (c)(1),
(2) Date: Jun. 19, 2018

(87) PCT Pub. No.: WO2017/114574
PCT Pub. Date: Jul. 6, 2017

(65) Prior Publication Data
US 2018/0375991 A1   Dec. 27, 2018

(51) Int. Cl.
*H04M 3/38*     (2006.01)
*H04W 4/029*    (2018.01)
(Continued)

(52) U.S. Cl.
CPC ............ *H04M 3/38* (2013.01); *H04W 4/029* (2018.02); *H04W 80/10* (2013.01); *H04W 84/12* (2013.01)

(58) Field of Classification Search
CPC ..... H04W 84/12; H04W 84/18; H04W 80/04; H04W 8/26; H04W 88/06
(Continued)

(56) References Cited

U.S. PATENT DOCUMENTS

2006/0293024 A1\* 12/2006 Benco ................ H04M 7/006
                                                         455/404.2
2007/0189279 A1   8/2007 Thalanany et al.
(Continued)

OTHER PUBLICATIONS

"List of Emergency Telephone Numbers", https://en.wikipedia.org/wiki/List_of_emergency_telephone_numbers, pp. 1-14.

*Primary Examiner* — Gbemileke J Onamuti
*Assistant Examiner* — Sanjay K Dewan
(74) *Attorney, Agent, or Firm* — Murphy, Bilak & Homiller, PLLC

(57) ABSTRACT

Devices that connect via a WLAN and Internet to communication network, e.g. a Public Switched telecommunication network (PSTN) can call e.g. an emergency centre. The method proposed, defines enables the device that initiates a call setup via a WLAN to provide the emergency centre with geographical location information by retrieving this information locally by e.g. a GPS module. The operator of the phone of the subscriber maintains a database wherein the identity of the Subscriber Identity Module (SIM) is recorded. The subscriber is enabled to add devices that generally have no SIMs (non-SIM devices), such as tablets to the database. In determining whether a WLAN based call setup to the emergency centre is allowed, it is checked with the database whether a record for the non-SIM device is present, and valid.

18 Claims, 11 Drawing Sheets

(51) Int. Cl.
*H04W 84/12* (2009.01)
*H04W 80/10* (2009.01)

(58) Field of Classification Search
USPC .......................................................... 370/338
See application file for complete search history.

(56) References Cited

U.S. PATENT DOCUMENTS

| | | | |
|---|---|---|---|
| 2008/0096504 A1* | 4/2008 | Linkola | H04M 7/0084 455/187.1 |
| 2010/0153567 A1* | 6/2010 | Lu | H04L 65/1016 709/229 |
| 2013/0122851 A1 | 5/2013 | Michaelis et al. | |
| 2013/0159520 A1 | 6/2013 | Engelhart et al. | |

* cited by examiner

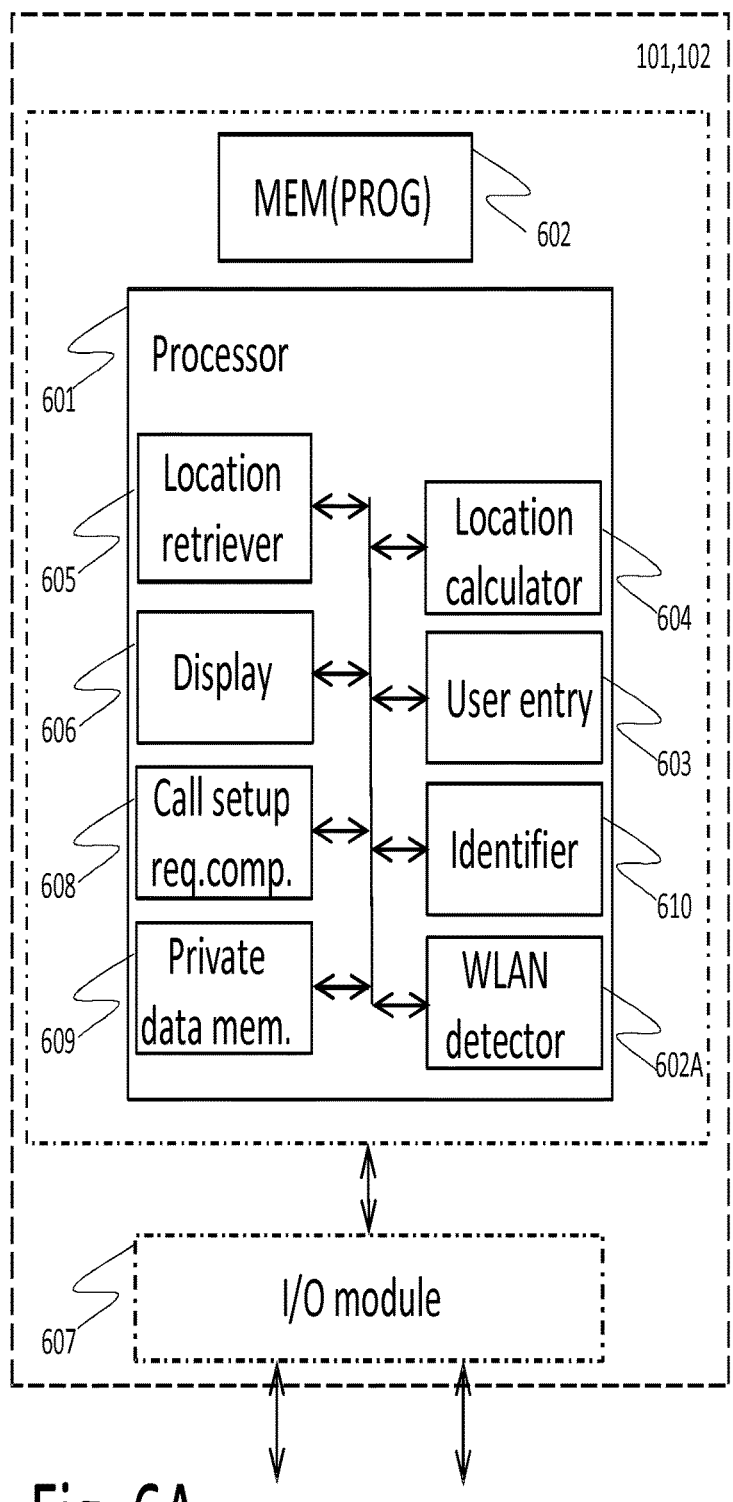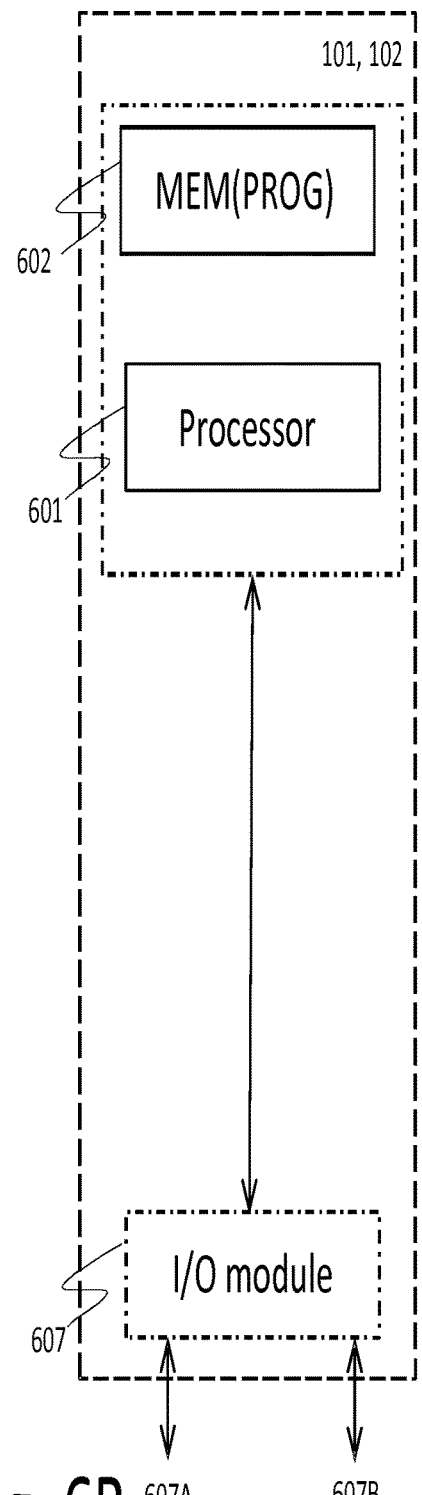
Fig. 6A
Fig. 6B

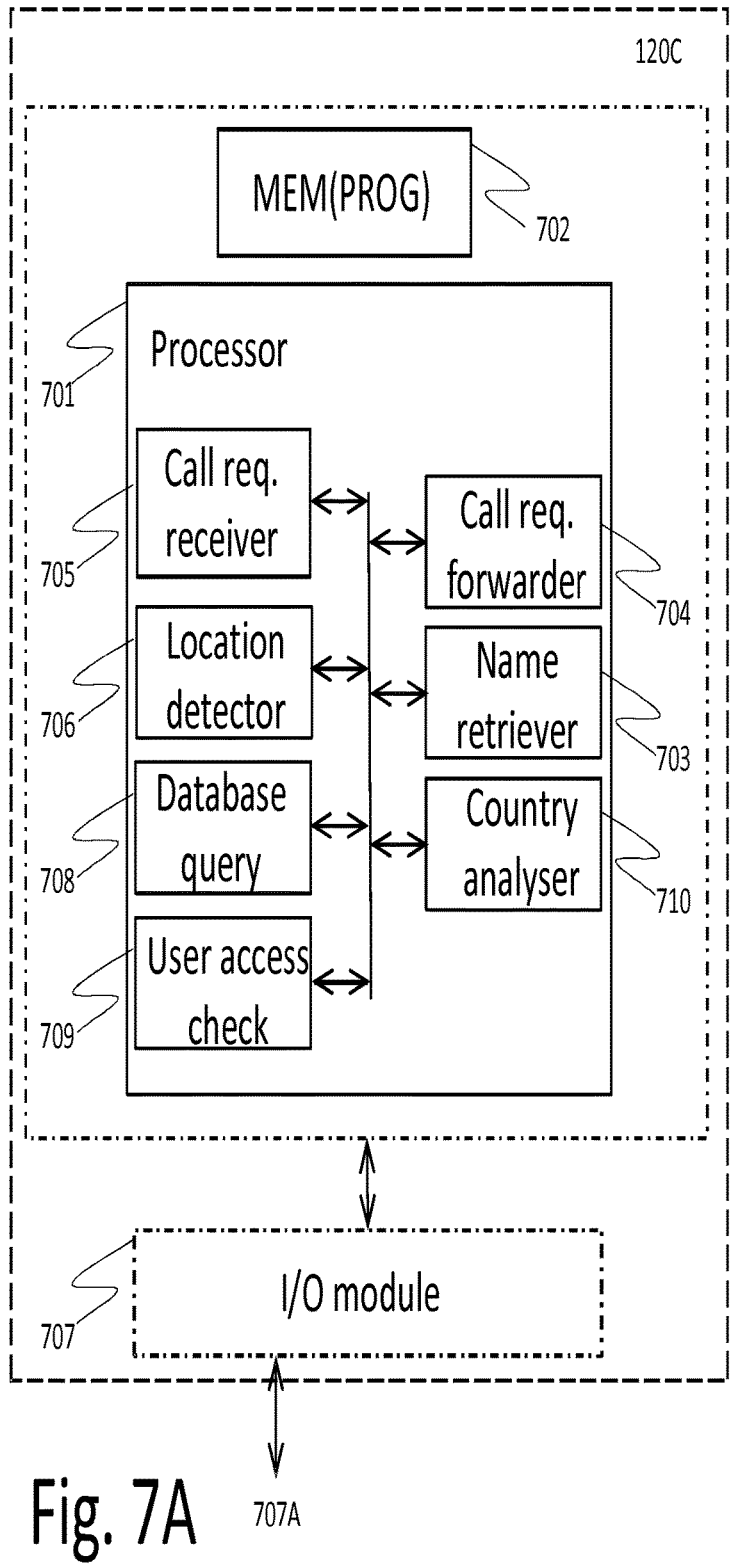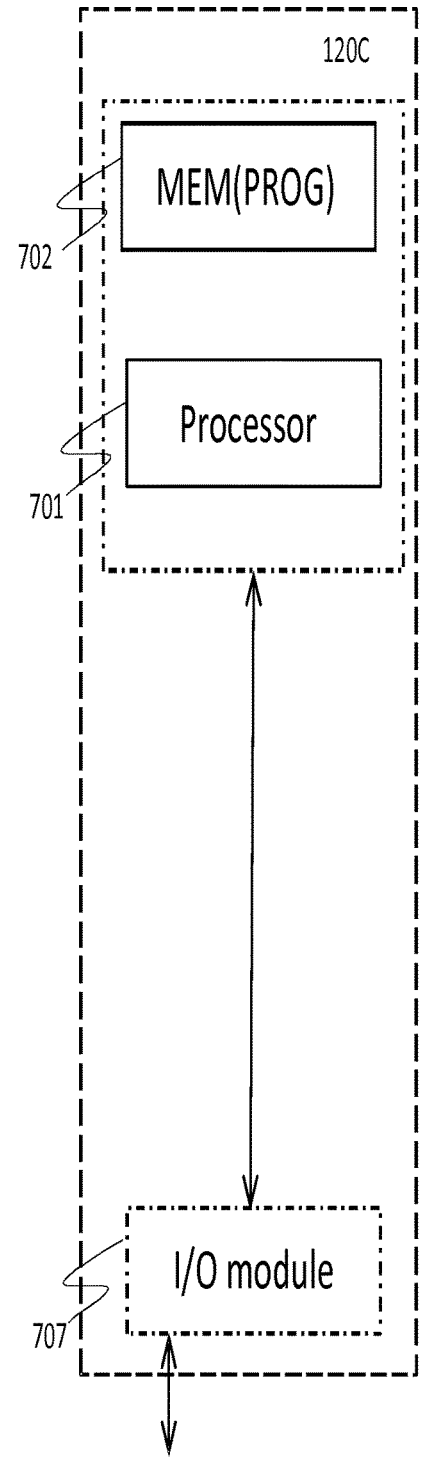
Fig. 7A
Fig. 7B

METHOD, SYSTEM AND DEVICE FOR PROVIDING A SETUP OF AN ENHANCED CALL VIA A WIRELESS LOCAL AREA NETWORK

TECHNICAL FIELD

The present invention relates generally to a method, and system to enable a mobile User Equipment, to perform an enhanced call setup, wherein the mobile User Equipment operates in a Wireless Local Area Network.

BACKGROUND

Mobile communications have taken up and provided the possibility of communication almost anywhere, as long access coverage is available. With the arrival of the 2.nd Generation (2G), 3G and 4G telecommunications networks, a wide variety of communication services have been developed.

A public mobile telecommunication operator provides services to its subscribers with legacy services as speech and data, and as well with services like e.g. Virtual Private Network (VPN) solutions, call diversion, ring-back services, and perceives a relation with a customer as an important asset.

Additionally to public mobile telecommunication services, as mentioned above, Wireless Local Area Networks (WLANs) have evolved, e.g. WLANs complying with the IEEE 802.11 suite, also denoted as WiFi. A WLAN offers also mobile telecommunication services, provided by applications such as Skype or FaceTime from Apple, mainly deployed by mobile User Equipment (UE) which are not designed to be used in public telecommunication networks, such as tablets or Laptop computers.

One of the capabilities, public mobile telecommunication operators offer to a subscriber, is to use a mobile UE (with a Subscriber Identity Module (SIM)) having WLAN capabilities, for a call setup wherein the mobile UE is located in a WLAN's coverage and operating via the WLAN. When setting up a call, the call setup is routed via the WLAN, via a server of an Internet Service Provider (ISP) in the Internet, towards the operator's domain for terminating the call setup. This capability increases the (in-door) coverage of a public mobile telecommunication network.

Tablets are generally not equipped with a Subscriber Identity Module (SIM) like mobile UE such as mobile phones or smartphones need to have for operating in a public mobile telecommunication network. The SIM is associated, by means of a database under control of the operator, with the subscriber's phone number and invoice address in case of post payment, and constitutes a binding between an operator and its client, the subscriber. The database under control of the operator is known as a Home Location Register (HLR) or Home Subscriber Server (HSS).

The use of a mobile UE with a SIM, such as a smartphone, and the use a mobile UE without a SIM, such as a tablet is different, as e.g. for a call setup where a geographical location of the calling mobile UE is required. A mobile UE with a SIM has the latest Location Update (LU) available in the HSS or HLR, while there is no actual position provided during a call setup by a mobile UE without a SIM, like a tablet.

When a mobile UE with a SIM operates in the public mobile telecommunication network, the latest LU, stored in a Home Subscriber Server, provides a geographical location of the mobile UE. However when the mobile UE with SIM has roamed into an area covered by a WLAN, and operates in that WLAN, the latest LU might not be the most accurate geographical location. In particular when an emergency centre is called, and the geographical location is provided by the HSS or HLR, the accuracy of the geographical location might not be as desired. An emergency centre is also known as Public Safety Answering Point (PSAP).

When a mobile UE without a SIM in a WLAN, such as a tablet calls an emergency centre, the emergency call is forwarded via the WLAN towards the operator's domain, and the actual geographical location information of the device or other useful information is not provided to the emergency centre.

Furthermore when subscribers of a mobile operator are using mobile UEs without a SIM, less possibilities for maintaining a relationship are present as the SIM, comprising an International Mobile Subscriber Identity (IMSI) having a unique identity in a range belonging to a particular operator, is absent. The SIM constitutes, apart from having an address to charge network usage, a binding with an operator's customer, enabling e.g. to make special offers.

Although the operator might have a geographical address, with State/Postal Code/City/Street/Number, of the associated mobile UE with SIM, which is applied for charging calls, this address does not necessarily be the address where the tablet resides during setting up an emergency call.

In some countries there is an obligation for public telecommunication operators according to national regulations, to provide geographical location information for calls setup to an emergency centre.

Additionally, the operator, in servicing and maintaining its subscribers, has no means to check whether a tablet without SIM that is making a call via the WLAN, is in a particular way associated with the subscriber's mobile UE with SIM.

Hence, there is a need for an enhanced call setup when a calling mobile UE operates in the WLAN environment.

SUMMARY

An object of the embodiments herein is to provide an enhanced call setup in a Wireless Local Area Network (WLAN) environment.

A network enabled to perform a method of setting up an enhanced call via a Wireless Local Area Network, WLAN is proposed, wherein the network comprises the WLAN, a User Equipment, UE, a communication node and a communication network. A Subscriber Identity Module (SIM) local to a UE, forms a binding between a subscriber and an operator of a public telecommunication network. A UE, with a SIM (SIM-UE) is regarded a UE that is enabled to operate in the operator's public telecommunication network, while a UE without a SIM (non-SIM UE) is regarded to be not able to operate ion a public telecommunication network. Both the SIM-UE and the non-SIM UE are regarded to be able to operate in a WLAN environment.

The UE, in the network is either a SIM-UE or a non-SIM UE, and has a capability to setup a call via the WLAN. In the network, the UE, the communication node, the communication network and the WLAN are communicatively connected.

The method of setting up an enhanced call via a Wireless Local Area Network, WLAN comprises a number of the steps wherein as a first step the UE retrieves geographical location information that representing its geographical location. The UE subsequently provides an identifier that identifies the UE, and the geographical location information in a call setup request to the communication node.

The method comprises another step wherein the communication node checks whether the identifier identifying the UE is comprised by a record of a user accessible database. When the identifier is comprised by the record, the communication node forwards the call setup request to the communication network. Thereby a call-setup establishment is enabled with the geographical location information of the UE.

The checking step comprises further a check whether a list of conditions is fulfilled, in order to allow the forwarding of the call setup request. And information local to the communication node is added to the call setup request towards the communication network.

The method also enables a UE, being a UE comprising a SIM, associated with an identifier, has the capability to operate in a wireless public telecommunication network, to perform a number of steps. A first step is to retrieve geographical location information by detecting an identity of the WLAN and requesting a geographical location database for a geographical location associated with the identity of said WLAN. Otherwise the geographical location might be obtained by activating a device local to the UE wherein this device is arranged to provide a geographical location.

The UE is enabled to transmit a call setup request via the WLAN, wherein the retrieved geographical location information is comprised by the request.

The method does also enable a UE that has no SIM, and as such cannot operate in a wireless public telecommunication network, to perform a number of steps. One of the steps is to retrieve its geographical location information by detecting an identity of the WLAN and requesting a geographical location database a geographical location associated with the identity of said WLAN.

Another method to obtain its geographical location is to activate a device local to the UE wherein the device arranged to provide a geographical location.

The method provides additionally to have the UE transmit a call setup request via the WLAN wherein the retrieved geographical location information is comprised by the request.

Additionally when the communication node checks the user accessible database there are records in the database there is an association between particular records for a SIM UE and particular records for a UEs not having a SIM. The information comprised by the associated record for a SIM-UE is comprised by a call setup from a non-SIM UE.

The checking step, as referred above may also comprise checking whether the record association fulfils a list of conditions, in order to allow forwarding of the call setup request to the communication network.

When in response to the setup of the call a second bearer from the destination, e.g. the emergency centre, towards the calling UE is setup, there is a means created to provide predetermined information that is stored locally to the UE, towards the emergency centre.

The solution proposes a method in a SIM UE wherein a call is setup via a Wireless Local Area Network, WLAN, and wherein the call setup comprises an identifier identifying the SIM-UE like the International Mobile Subscriber Identity (IMSI).

This identifier is comprised by a record of a user accessible database. The SIM-UE is proposed to perform a number of steps such as retrieving a geographical location information representing a geographical location of the SIM-UE, and providing the identifier and the geographical location information in a call setup request to a communication node.

Additional to the steps in the SIM-UE listed above, the UE further performs the steps of retrieving geographical location information by detecting an identity of the WLAN. The identity of the WLAN is used to requesting a geographical location database for a geographical location associated with said the identity of said WLAN.

Alternatively the geographical location information is obtained by activating a device local to the SIM-UE, wherein the device is arranged to provide a geographical location. Further additional steps in the SIM-UE are the composing of the call setup request via the WLAN to the communication node, wherein the call setup request comprises the retrieved geographical location information, and providing the composed call setup request via the WLAN.

Also a method in a non-SIM UE is provided wherein the non-SIM UE performs the enhanced call setup method via a Wireless Local Area Network, WLAN.

This non-SIM UE is associated with an identifier that identifies the UE, such as a Media Access Control (MAC) address. This MAC address is comprised by a record of a user accessible database.

The non-SIM UE performs the steps of retrieving a geographical location information representing a geographical location of the non-SIM UE, and providing a call setup request comprising the geographical location information via the WLAN to the communication node.

The non-SIM UE performs additional steps like retrieving a geographical location information by detecting an identity of the WLAN and requesting a geographical location database for a geographical location associated with the identity of said WLAN.

Alternatively the non-SIM UE activates a device local to the UE, wherein the device is arranged to provide a geographical location. The non-SIM UE additionally composes the call setup request with the retrieved geographical location information.

It is proposed that the non-SIM UE composes the call setup request as a SIP invite message that comprises the geographical location information.

The enhanced call setup method via a WLAN is proposed as a method in a communication node, wherein the communication node is communicatively connected to the WLAN, a communication network, the Internet, and a UE, being a SIM-UE or a non-SIM UE.

The communication node performs the step of receiving a call setup request that is initialized by the UE, and wherein the call setup request comprises an identifier identifying the UE, and geographical location information representing the geographical location of the UE. The identifier is suggested to be an IMSI or MAC address.

The communication node performs the further step of checking whether the identifier in the identifier identifying the UE is comprised by a record of a user accessible database. When the identifier is indeed comprised by the record, the call setup request is forwarding to the communication network. Thereby the communication node enables a call-setup establishment with the geographical location information of the UE.

The communication node performs the step of checking wherein it is checked whether a list of conditions is fulfilled, in order to allow forwarding of the call setup request. The method in the communication node comprises the step of receiving, wherein a Session Initiation Protocol, SIP, INVITE message is received, and wherein the geographical location information is forwarded in SIP message comprising a P-Access Network Info, PANI, header towards the communication network.

The method in the communication node relies on a user accessible database that comprises associated between records regarding a SIM-UE and associated record regarding a non-SIM UE. When a non-SIM UE makes a call setup request, data regarding the associated SIM-UE record is incorporated in the call setup request message.

The solution proposes a system arranged for setting up an enhanced call via a Wireless Local Area Network, WLAN, wherein the network comprises, the WLAN, a UE, being either a SIM-UE or a non-SIM UE, a communication node and a communication network.

The UE has a capability to setup a call via the WLAN and is arranged to retrieve a geographical location information representative for the geographical location of the UE. The UE is further arranged to provide the geographical location information in a call setup request to the communication node. The communication node is arranged to check whether an identifier identifying the UE, such as an IMSI or MAC address is comprised by a record of a user accessible database. When the identifier is comprised by the record, the communication node is arranged to forward the call setup request to the communication network. Thereby a call-setup establishment with geographical location information of the UE is enabled.

The solution proposes a system arranged for setting up an enhanced call via a Wireless Local Area Network, WLAN, wherein the network comprises, the WLAN, a UE, being SIM-UE, a communication node and a communication network.

The non-SIMUE is arranged to retrieve a geographical location information representative for the geographical location of the UE by detection of an identity of the WLAN and request a geographical location database for a geographical location associated with the identity of said WLAN.

Alternatively a local device in the non-SIM UE is activated, wherein the device is arranged to provide a geographical location. The non-SIM UE is further arranged to transmit a call setup request via the WLAN wherein the retrieved location information is comprised by the request.

A UE is proposed wherein the UE is ether a SIM-UE or a non-SIM UE, enabled to setup a call via the WLAN network, and wherein the UE is arranged to retrieve a geographical location information representing the geographical location of the UE. The UE is further arranged to provide the retrieved geographical location information in a call setup request to the communication node.

The UE is still further arranged to retrieve the geographical location information by detection of an identity of the WLAN and request a geographical location database a geographical location associated with the identity of said WLAN.

Alternatively the UE is arranged to activate a device local to the UE, wherein the device arranged to provide an geographical location. The UE is still further arranged to transmit a call setup request via the WLAN wherein the retrieved location information is comprised by the request.

The solution provides a communication node that is arranged for enabling an enhanced call setup via a Wireless Local Area Network, WLAN.

The communication node is communicatively connected to the WLAN, a communication network, the Internet, and a UE, being a SIM-UE or a non-SIM UE.

The communication node is arranged to receive a call setup request of the UE, wherein the call setup request comprises geographical location information representing the geographical location of the UE.

The communication node is arranged to check whether an identifier identifying the UE is comprised by a record of a user accessible database. When the identifier is comprised by the record, the communication node forwards the call setup request to the communication network. Thereby a call-setup establishment with the geographical location information of the UE is enabled.

The solution offers a communication node comprising modules, for an enhanced call setup via a Wireless Local area Network, WLAN.

The communication node is communicatively connected to the WLAN, the Internet, a communication network and a UE, being a SIM-UE or a non-SIM UE.

The communication node has a receiver module for receiving a call setup request of the UE, wherein the call setup request comprises an identifier identifying the UE and geographical location information representing the geographical location of the UE.

The communication node further comprises a detector module for detecting the identifier identifying the UE from the call setup request that was received.

The communication node further comprises a check module for checking whether the identifier identifying the UE is comprised by a record in a user accessible database. The communication node further comprises a forwarding module, forwarding the call setup request to the communication network, and thereby enabling a call-setup establishment with the geographical location information of the UE.

The solution provides a computer program product that is executed in the communication node, wherein the node is configured for setting up an enhanced call via a Wireless Local Area Network, WLAN.

The computer program comprises computer code which, when run on processing circuitry of the communication node, causes the communication node to receive a call setup request of the UE, being a SIM-UE or a non-SIM UE, wherein the call setup request comprises a geographical location information representing the geographical location of the UE.

The computer program also causes a check whether an identifier identifying the UE is comprised by a record of a user accessible database.

And when the identifier is comprised by the record and the computer program causes forwarding of the call setup request to the communication network, thereby enabling a call-setup establishment with the geographical location information of the UE.

When mobile operators would have the technical means to provide services to their subscribers that fully apply the possibilities of existing WLAN coverage, public networks would advantageously be offloaded and the coverage will be increased. Furthermore the subscribers would advantageously be enabled to apply multiple mobile UEs with or without public telecommunication capabilities, generally offering the same services with the same user experience.

An operator is advantageously enabled to perform policy deployment as expressed in number of non-SIM UEs, type of non-SIM UE or SIM-UEs allowed to use services of the operator A subscriber is advantageously offered with a service wherein a call to an emergency centre is enhanced with a geographical location of the calling device, and additionally preferably a name associated with the calling mobile UE, and an address for setting up a link to retrieve additional private data stored at the mobile UE.

The solution advantageously offers the subscriber flexibility in adding, deleting or amending data regarding non-SIM devices.

The solution advantageously offers subscribers a service to be notified on multiple devices when a change in the user accessible database has been made.

The steps of any method disclosed herein do not have to be performed in the exact order disclosed, unless explicitly stated.

BRIEF DESCRIPTION OF THE DRAWINGS

FIG. 6A is a block diagram illustrating an embodiment of an entity;

FIG. 6B is a block diagram illustrating an embodiment of an entity;

FIG. 7A is a block diagram illustrating an embodiment of an entity;

FIG. 7B is a block diagram illustrating an embodiment of an entity, and

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

The embodiments according to the present invention are now illustrated in more detail with reference to the enclosed drawings. A WLAN supports Internet connectivity of a mobile UE, operating in said WLAN.

A tablet, is regarded to operate in a WLAN, but is generally not regarded to be able to operate in a public mobile telecommunications network, such as telecommunication networks with access technologies based on cellular phone technologies like Global System for Mobile communications (GSM), Universal Mobile Telecommunications System (UMTS) or Long Term Evolution (LTE). For these public telecommunication networks a SIM is required to constitute a subscriber relation to an operator of a public telecommunication network.

For the remainder of this section a tablet, is represented by the term "non-SIM" UE. This term also comprises other mobile UEs that have the same characteristics as a tablet, such as mobile UEs that do not comprise a SIM but have capabilities to operate in a WLAN.

Mobile UEs that have capabilities to operate in a public telecommunication network, such as smartphones are, for the remainder of this section, represented by the term "SIM-UE". Generally these mobile UEs are additionally considered to have a capability to operate in a WLAN environment.

Figure 1:
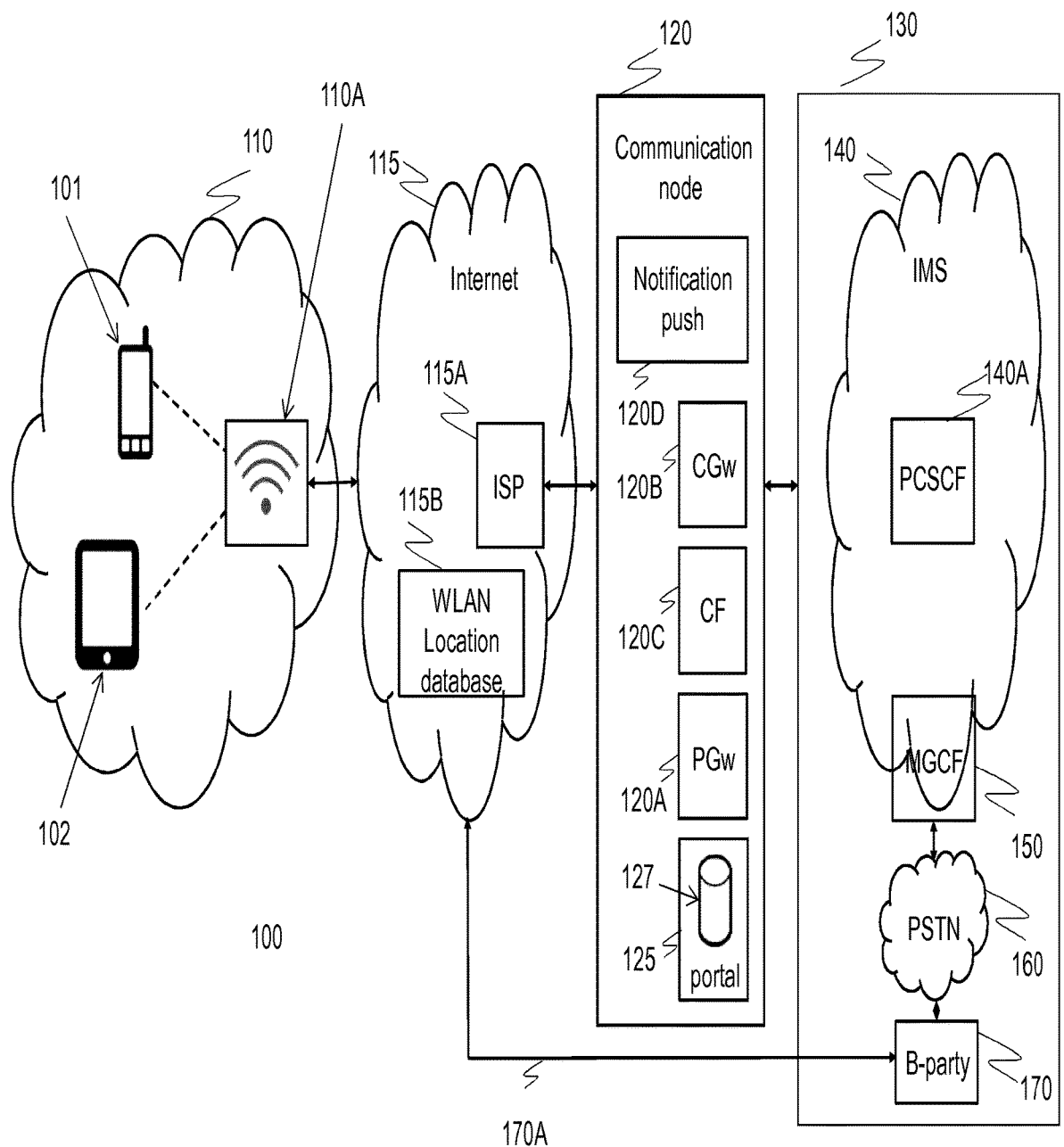
FIG. 1 is a block diagram illustrating an embodiment of a system.

FIG. 1 is a block diagram illustrating an embodiment of a system. The system is presented by a network 100, arranged to support the setup of an enhanced call via a Wireless Local Area Network (WLAN) 110.

In the WLAN two mobile UEs are depicted, a SIM-UE 101, and a non-SIM UE 102. Both mobile UEs have internet connectivity via a wireless router 110A providing the WLAN coverage for WLAN 110. The WLAN might be under control of—and in possession of a subscriber, although also operators might offer a public WLAN.

The wireless router 110A is connected to the Internet 115 by means of e.g. a coax cable, copper wire, a wireless link, via a modem (not shown), etc.

The Internet 115 comprises an Internet Service Provider (ISP) server 115A, arranged to support a connection between the mobile UEs 101, 102 and a node outside the Internet, such as communication node 120. The Internet further comprises a WLAN location database 115B, which is arranged to supply geographical coordinates when an identifier of a WLAN is provided.

Communication node 120 is a node maintained by an operator of a public mobile telecommunication network and comprises a number of services, which may be implemented as separate functions, servers, or a cloud implementation, hereafter denotes as the functions.

A Packet data Gateway 120A (PGw) is arranged to receive and send data packets from—and to the calling mobile UE 101, 102 and distribute these data packet to the functions, or collect data packets from the functions. Communication Gateway 120B (CGw) is arranged to send and receive data packets to—and from a terminating network 130 and distribute those data packets to the functions, or collect data packets from the functions.

Data packets may represent signalling messages such as a Real Time Control Protocol (RTCP) or payload data, Such as Real-time Transfer Protocol (RTP) streams.

The connection between the mobile UE 101, 102 and the communication node is preferably a secure link, such as a secure Internet Protocol (IP) tunnel (IPSec), where the mobile UE is authenticated at the Packet data Gateway 120A.

An Internet portal 125 is arranged to have subscribers log in with a user identification and password, via the Internet 115. Logging in can occur by means of mobile UEs 101 or 102, but also any Internet connected mobile UE or device, such as a Personal Computer, that enables a login procedure. The Internet portal 125 maintained by the operator, allows subscribers to make specific changes in a database 127, wherein only the operator has full control over the portal 125 and the database 127.

The database 127, which might consist of multiple associated distributed databases, has a record structure where for each subscriber a record comprising its home address is recorded and an identifier identifying at least one SIM-UE 101. Further associated records with the same subscriber comprise identifiers of non-SIM UEs.

The communication node 120 further comprises a function denoted as Control Function (CF) 120C, arranged to analyse a received a call setup request, from the mobile UE 101, 102, via the Packet data Gateway. The CF is further arranged to initialize a check in database 127 whether the identity of the mobile UE 101, 102 corresponds to a stored identity in a record of the database 127, and to forward the call setup via the Communication Gateway 120B in the direction of the communication network 130.

The check comprises additionally further checks whether the mobile UE 101, 102, is for example, allowed according to a contract, to still use the services of the operator for the non-SIM UE.

The communication node 120 still further comprises a notification push function 120D for signalling a message to the mobile UE 101, 102, when e.g. a contract between the subscriber and the operator on use of a non-SIM UE will lapse in the near future.

The functions in the communication node are depicted as separate entities but could also be combined in alternative combinations, either in cloud implementations or hard- or software.

The communication network 130 comprises as an example an Internet Protocol (IP) Multimedia System (IMS) core network 140, having a Proxy-Call Session Control Function (P-CSCF) 140 as an interface towards the IMS network nodes, and an MGCF (Media Gateway Control Function) 150 as a gateway to terminating network, in this case as an example a Public Switched Telephone Network (PSTN) 160, which connects to a B-party 170 for terminating the call setup request.

The called party, also known as B-party 170 is in the examples below depicted as an emergency centre, which needs to be aware of the geographical location of the subscriber calling via a WLAN. The B-party also has a connection to the Internet 115 for establishing a second link 170A towards the mobile UE 101, 102 for retrieving additional data stored in the mobile UE. The emergency centre is also known as Public Safety Answering Point (PSAP).

Although this description lists a number of services/servers/functions relevant for the explanation of the solution, the skilled reader would recognize that additional nodes in are present in a network like e.g. a Home Subscriber Server (HSS), Serving-Call Session Control Function (S-CSCF), etc.

Figure 2A:
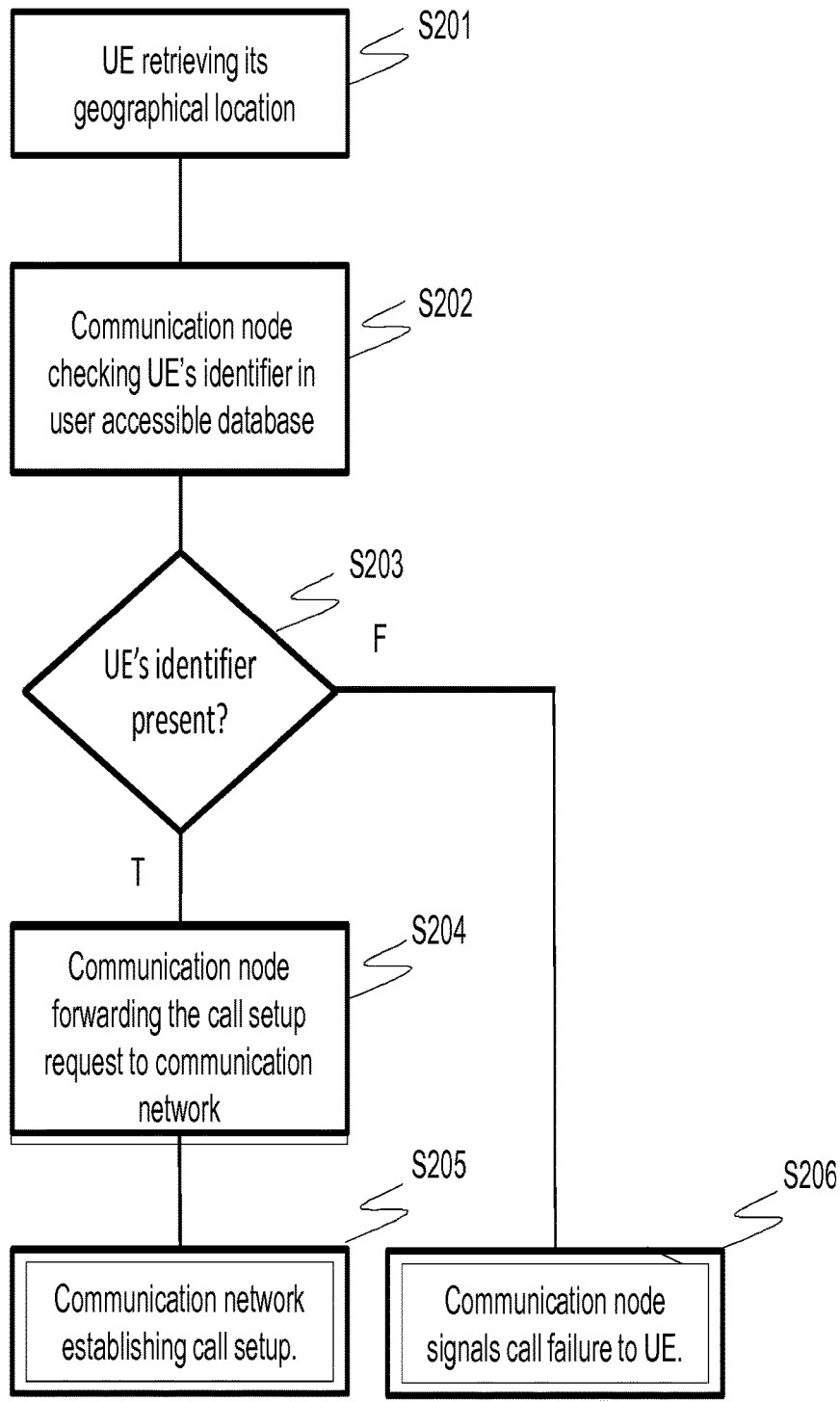
FIG. 2A is a flowchart diagram illustrating an embodiment of a method.

FIG. 2A is a flowchart diagram illustrating an embodiment of a system. FIG. 2A depicts the method of a setup of an enhanced call via a Wireless Local Area Network (WLAN) 110 within the network 100.

As a first step the mobile UE 101, 102, residing and operating in the coverage of the WLAN, retrieves S201 its geographic location information and provides this geographical location information, with an identifier identifying the mobile UE in a call setup request to the communication node 120.

The CF 120C in communication node 120 checks S202 whether the received identifier is comprised by a record of user accessible database 127. When a test S203 yields True, the CF in the communication node forwards S204 the call setup request, comprising the geographical location information and the identifier to the communication network 130 for establishing S205 the call.

The identifier represents a unique identity of a mobile UE, either a SIM 101 or non-SIM UE 102. For a SIM-UE an International Mobile Subscriber Identity (IMSI) having a unique identity in a range belonging to a particular public mobile telecommunication network operator, can be used, and for a non-SIM UE a Media Access Control (MAC) address, which is regarded as well a unique address can be used.

The records in the user accessible database 127 for a SIM-UE comprise a name of the subscriber, and preferably a home address. In the forwarding S204 of the call setup, this subscriber name is preferably added to the call setup. When the call is established S205 in the communication network to an emergency centre, the geographical location of the mobile UE initializing the call, as well as the person's name, at least associated with the device making the call, are presented.

In case the test S203 yields False, the CF 120C in the communication node may signal S206 to the calling mobile UE that the call setup has failed. Alternatively when the communication node analyses the B-party address and detects that the B-party address is an emergency centre, the communication node might decide to forward the call setup to the communication network 130, albeit that no associated name can be provided, as presented above.

Figure 2B:
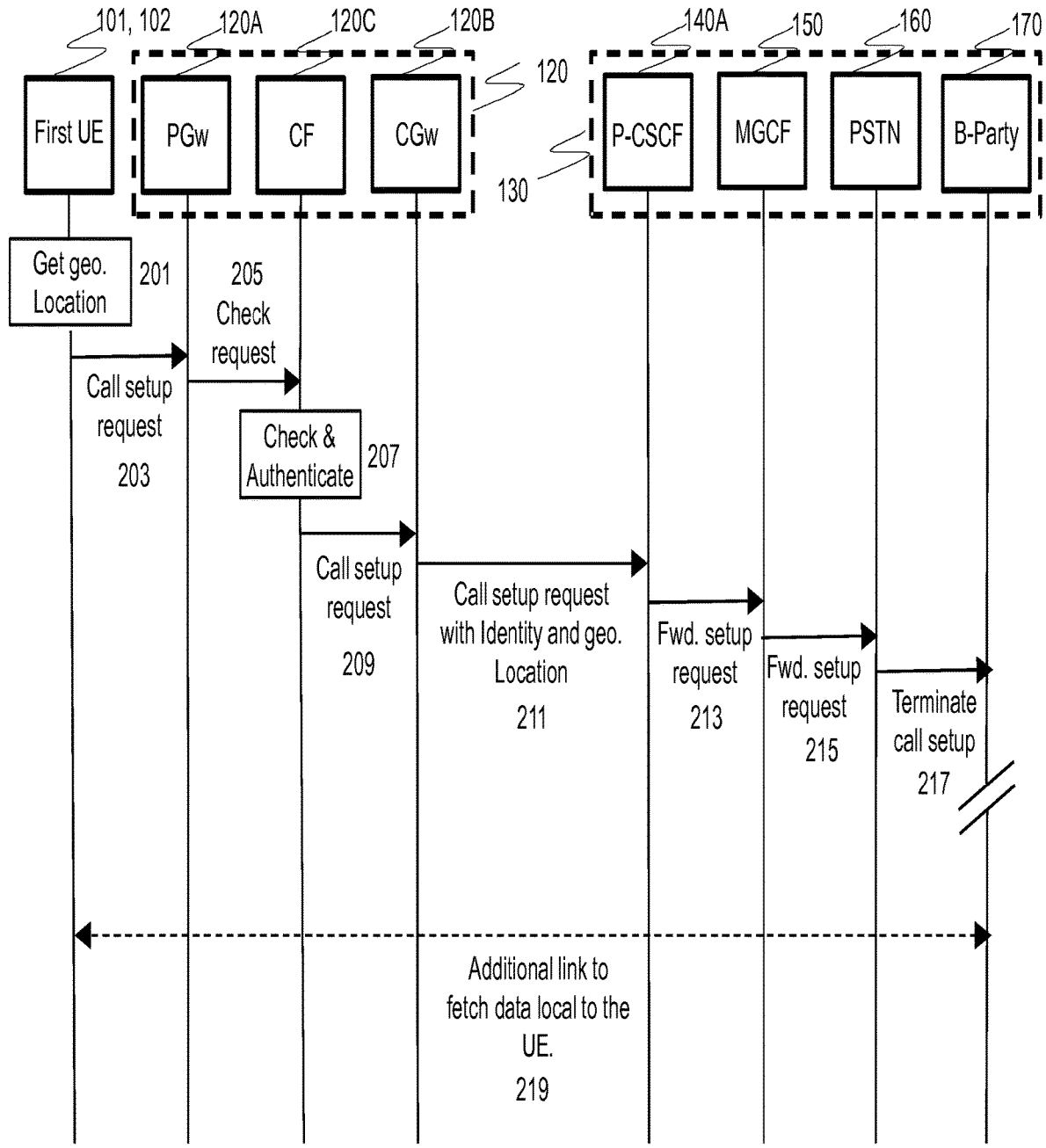
FIG. 2B is a signalling diagram illustrating an embodiment of a method.

FIG. 2B is a signalling diagram illustrating an embodiment of a system. FIG. 2B presents in detail the steps of a setup of an enhanced call via a Wireless Local Area Network (WLAN) 110 within the network 100.

The mobile UE 101, 102, operating in WLAN 110 initializes an enhanced call setup request by either a manual operation of the user or an automatically on a certain condition, e.g. when an acceleration force detector in the mobile UE detects passing a predefined level in combination with history on the mobile UE's speed. A manual call setup is performed by e.g. the phonebook, manual digit entry or a defined pre-programmed button.

When the enhanced call is setup, the actual location of the mobile UE is retrieved 201 by a method such as:

Activating a device for defining geographical coordinates, like a Global Positioning System (GPS);

Detecting the identifier of the WLAN, the mobile UE resides in, is connected to and operates in, and subsequently connect via the Internet to a WLAN location database 115B and providing the WLAN identifier and in response receiving the geographical coordinates;

Detecting multiple identifiers of WLAN where the mobile UE resides in, albeit not necessarily connected to, and providing each WLAN identifier to the WLAN location database 115B, in response receiving the multiple geographical locations. A program in the phone than calculates the average geographical location as a best estimate of its position. Preferably the Received Signal Strength Indication (RSSI) is involved in the calculations, such that WLANs having low signal strength have less weight in the estimated result.

The mobile UE may also provide its IP-address and port-number for an additional communication session in the call setup request.

When the calling UE 101, 102 has composed the message comprising the location information and other data as explained above, a bearer is setup via the wireless router 110A towards the ISP 115A in the internet. The IP-address or unique name of the communication node 120 of the particular operator is preprogramed in the UE, and provided in the composed message. The ISP routes the message towards node 120 for further handling, with support of a Domain Name Server for address resolving, if required.

The Packet data Gateway 120A receives 203 the call setup comprising geographical location information via a preferably secure IP tunnel, and forwards 205 the call setup to the Control Function 120C in the Communication node 120 for checking the request.

The Control Function checks 207 whether the call setup is allowed to be forwarded 209 towards the communication network 130. The identifier that identifies the mobile UE provided in the call setup request and is checked against records present in the user accessible database 127. The database has records for a subscriber's SIM-UE 101 and zero or more associated records for associated non-SIM UEs 102 of the same subscriber. If either an identifier within the SIM-UE or non-SIM UE record matches with the identifier in the call setup request, a subsequent check is executed. The subsequent test is whether the particular mobile UE is still under a contract with the operator.

Additional tests comprise a list of conditions, such as whether the contract is soon to be lapsed, in which case the Control Function is arranged to activate a notification function 120D to push a message to the mobile UE, indicating that the contract is soon to be lapsed with instructions how to extend the contract.

When the test yields that the call setup request is allowed to be forwarded to the communication network, the Control Function preferably queries the database 127 for a name, associated with the SIM-UE, in case the calling mobile UE is a SIM-UE, or when the mobile UE is a non-SIM UE, for the name that is associated with the SIM-UE that is associated with the particular non-SIM UE record.

The Control Function forwards 209 the call setup request via the Communication Gateway 120B towards 211 the communication network 130. The call setup request comprises an identifier identifying the calling mobile UE 101, 102, a geographical location information, and preferably a name associated with the calling mobile UE.

The IMS core network 140 receives the call via its P-CSCF node 140A and number analysis of the call setup request defines that an internal forwarding 213 to the MGCF node 150 is required.

The MGCF forwards 215 the call setup request to the PSTN 160 being the terminating network, and the PSTN delivers 217 the call setup at the B-party, in this example an emergency centre 170. The emergency centre answers the incoming call with UE identification, geographical location information and preferably an associated name.

If there is a need, the emergency centre may initialize 219 a link towards the calling mobile UE, as to retrieve additional information. If the calling mobile UE has provided its IP address and port number in the call setup, and a local application in the mobile UE listens to the particular port-number the additional information retrieval session can provide data stored locally in the UE, like personal data. The data is retrieved via a bearer 170A, setup by the emergency centre towards the calling UE 101, 102. For security reasons only white-listed B-parties may have communication sessions with the calling A-party.

Figure 3A:
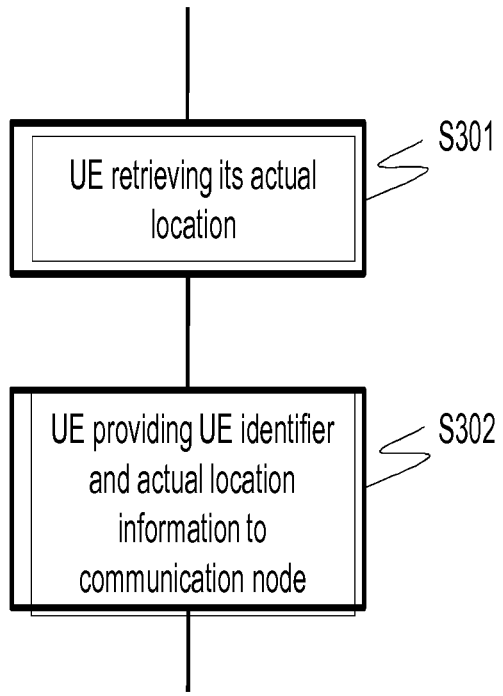
FIG. 3A is a flowchart diagram illustrating an embodiment of a method.

FIG. 3A is a flowchart diagram illustrating an embodiment of a system. FIG. 3A depicts the method in a mobile UE for a setup of an enhanced call via a Wireless Local Area Network (WLAN) 110.

The UE retrieves S301 its geographical location, e.g. by one of the methods listed above in the description of FIG. 2B. The UE provides S302 in a call setup request a combination of:

Geographical location information representing the mobile UE's retrieved geographical location;
An identifier identifying the calling mobile UE, such as an IMSI or MAC address; Optionally, an IP address and port number for a communication session to be initialized by the called B-party. This address does not necessarily have to be the address of the mobile UE in the WLAN, but can be an information source. A password can be given to authenticate by proxy a challenge response session between the B-party and a local application in the mobile UE or the information source.

It is regarded beneficial to the process of calling an emergency number that an application (app) local to the calling mobile UE 101, 102 provides a button on the screen, which when activated calls the emergency centre according to the solution proposed.

Figure 3B:
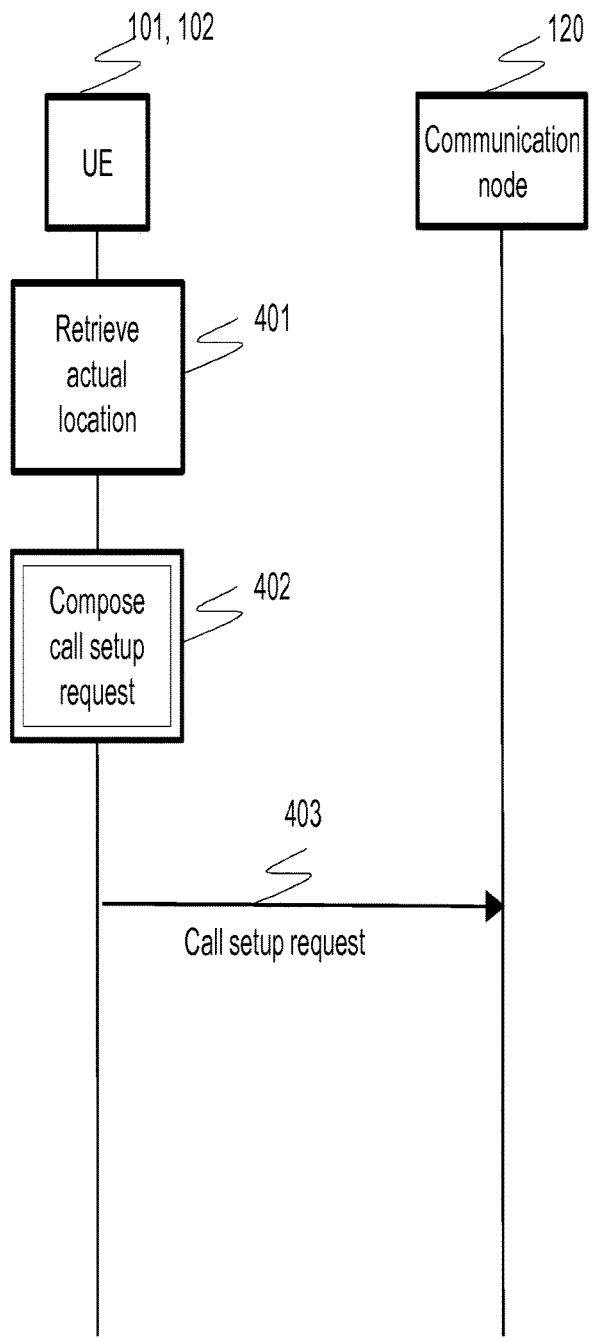
FIG. 3B is a signalling diagram illustrating an embodiment of a method.

FIG. 3B is a signalling diagram illustrating an embodiment of a system. FIG. 3B depicts the method in a mobile UE for a setup of an enhanced call via a Wireless Local Area Network (WLAN) 110.

The mobile UE, either a SIM-UE 101 or non-SIM UE 102, operating in the WLAN 110, retrieves 401 its geographical location, e.g. by one of the methods listed above in the description of FIG. 2B and composes 402 a call setup request. The call setup request is preferably a SIP INVITE message with the geo-private extension comprising the geographical location information.

The composed call setup request is sent 403 to the communication node 120 via the Internet 115, wherein the IP address of the particular communication node, belonging to the subscriber's operator is pre-programmed in the mobile UE 101, 102, hence the call setup request is routed to the public mobile network operator of the home country of the subscriber SIM-UEs and non-SIM UEs operating in a WLAN, irrespective of the geographical location of the WLAN, are registered with the IMS in the home country of the subscriber's public mobile network operator. As to arrange that the call setup is routed towards the relevant emergency centre, i.e. in the relevant country, area or state, the Control Function 120C in the communication node is arranged to derive the relevant country, area or state information from the geographical location information.

Figure 4A:
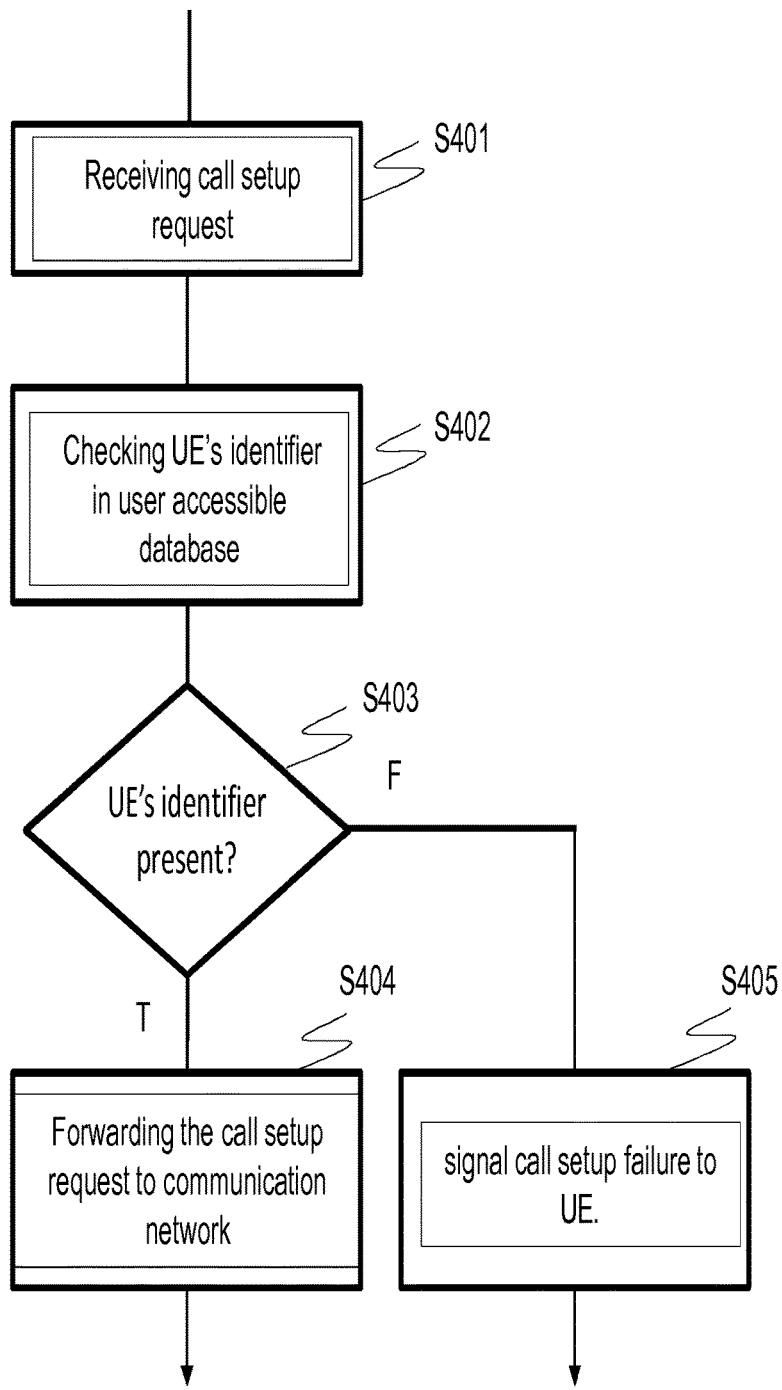
FIG. 4A is a flowchart diagram illustrating an embodiment of a method.

FIG. 4A is a flowchart diagram illustrating an embodiment of a system. FIG. 4A depicts the method in the communication node 120 for a setup of an enhanced call via a Wireless Local Area Network (WLAN) 110.

The Packet data gateway 120A comprised by the communication node receives S401 a call setup request initialized by the mobile UE 101, 102, wherein the call setup request comprises:

Geographical location information;
An identifier identifying the calling mobile UE;
Optionally, an IP address and port number of the mobile UE or other information source.

The Control Function 120C comprised by the communication node checks S402 whether the identifier identifying the calling mobile UE is present in the user accessible database 127, and checks S403 whether a contract permits providing services to the calling mobile UE. The contract is preferably available from the user accessible database.

When the test yields a True (T) the call setup request will potentially be forwarded S404 to the communication network. The Control Function derives the relevant country, area or state information from the geographical location information from the call setup request, and adds this country, area or state information in a P-Access Network Info (PANI) header of the SIP message to be forwarded to the communication network 130. The control function may search for the country, area or state information in a worldwide database wherein the geographical information, such as longitude and latitude coordinates are mapped on the service areas of emergency centres.

Preferably a name of a person or company associated with the calling device is provided as well to the emergency centre. The Control Function is arranged with the identifier of the calling mobile UE to select the subscriber's name from the user accessible database 127, in a record comprising the mobile UE's identifier, or the associated UE in case of a calling non-SIM UE. The Control Function is additionally arranged to translate the geographical coordinates into a State/Town/street/number address, and optionally replace the geographical coordinates in the call setup request. The translation is preferably performed by a Webserver that is to be queried.

The Communication Gateway 120B will forward S404 the SIP message towards the P-CSCF of the communication network.

In case the test S403 yields False (F) the calling mobile UE is signalled S405 that the call failed, although when it is detected that the call is made to an emergency centre, the call is optionally forwarded S404 just as if the test S403 yielded a True result. To summarize a call setup request entering the communication network comprises:

Geographical location information expressed in latitude and longitude or an address with State, County, Town, Postal code, street Number;
An identifier identifying the calling mobile UE;
Optionally, an IP address and port number of the mobile UE or other information source;
A Country, Area or State, depending on the coverage of an emergency centre;
Preferably a name of the person associated with the calling mobile UE.

Optionally the Control Function in the communication node is arranged to translate emergency centre phone numbers as there is no worldwide standard, see https://en.wikipedia.orq/wiki/List_of_emergency_telephone_numbers,
such that when a subscriber dials the "home" emergency number the Control Function translates the dialed number into the number of the Country/state/area where the subscriber resides. The translation of these numbers is preferably accomplished in a Webserver that is to be queried.

Figure 4B:
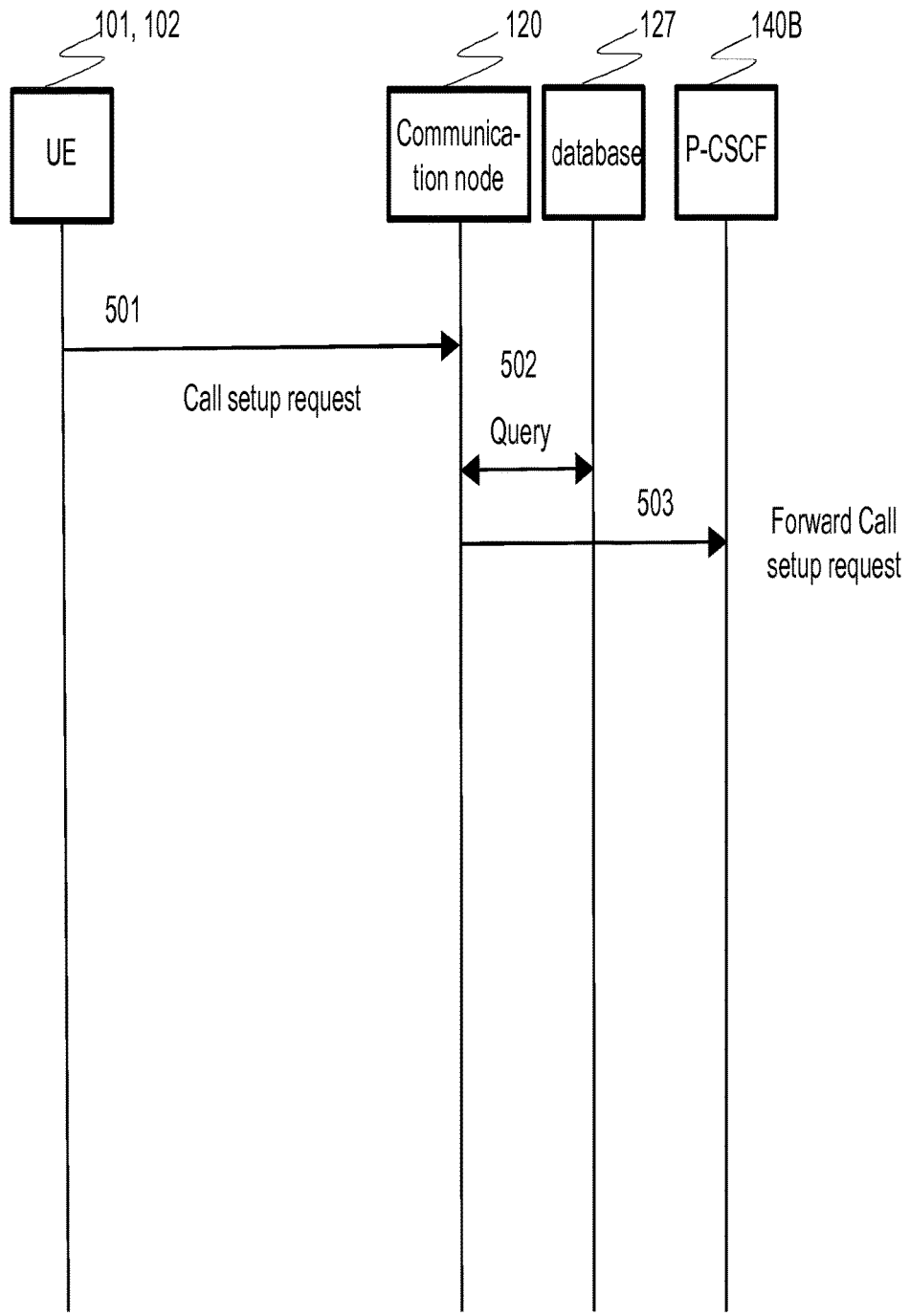
FIG. 4B is a signalling diagram illustrating an embodiment of a method.

FIG. 4B is a signalling diagram illustrating an embodiment of a system. FIG. 4B depicts the method in the communication node 120 for a setup of an enhanced call via a Wireless Local Area Network (WLAN) 110.

The Packet data Gateway 120A comprised by the communication node 120 receives 501 a call setup request, via a preferably secure link, initialized by the UE 101, 102. The Packet Gateway forwards the call setup request internally to the functions of the communication node.

The Control Function 120C comprised by the communication node performs the check whether the call setup request is allowed to be forwarded towards the communication network 130 by querying 502 the user accessible database 127. The Control Function 120C adds additional information to the call setup request, such as country/state/area information and preferably a name of a person or company associated with the called mobile UE, and forwards the call setup request to the Communication Gateway 120B.

The Communication Gateway forwards 503 the call setup request to the P-CSCF comprised by the communication network 130.

Figure 5:
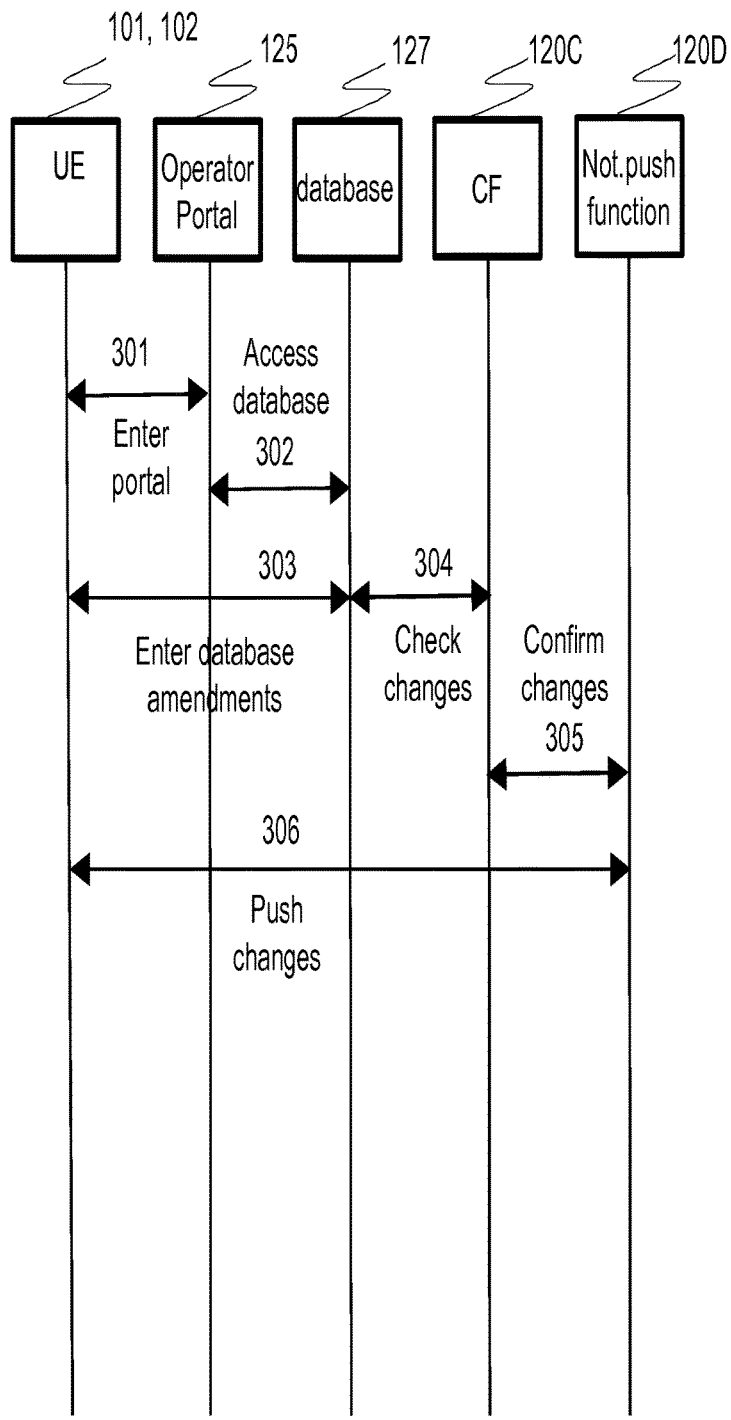
FIG. 5 is a signalling diagram illustrating an embodiment of a method.

FIG. 5 is a signalling diagram illustrating an embodiment of a system. FIG. 5 depicts a method in the network 100 for a setup of an enhanced call via a Wireless Local Area Network (WLAN) 110, wherein the user accessible database 127 is accessed.

A subscriber needs to have his/her one or more non-SIM UEs 102 registered in the user accessible database as to enable services for these UEs from the operator, being the operator of a public mobile communication network for the SIM-UE 101 of the same subscriber.

The database 127 is equipped by the operator with a record associating the subscriber's SIM-UE with a unique identifier such as the IMSI with the subscriber's name, address and any additional information useful for determining a charging or home address.

The subscriber enters non-SIM UEs by means of unique identifiers, such as MAC addresses, in a way that additional records are filled with the identifier and an association with the record comprising the SIM-UE.

The database 127 preferably also has the contract with terms and conditions of use, associated with each subscriber, with e.g. start and lapse period, maximum number of non-SIM UEs to be entered, whitelists, blacklists, additional services to be used, etc.

The subscriber is allowed to make a limited number of changes in the database, such as entering, adapting and deleting records comprising non-SIM UEs. Additionally subscriber's private data can be entered in database 127, to be used for emergency centres. Entering, adapting and deleting records is performed under control of the operator.

The subscriber can view the contract with the mobile communication network operator.

The subscriber applies as an example the UE 101, 102 to enter 301 the operator portal 125 via the Internet 115, although any device with Internet connectivity with an appropriate user interface can be used.

The operator portal is accessible in a secure way, e.g. with a User Identification/password combination. When the subscriber has successfully entered the operator portal, access 302 is made to the user accessible database. Subsequently the subscriber may enter, adapt or delete 303 records in a copy of the database under control 304 of the Control Function 120C. When a subscriber e.g. enters another non-SIM UE above a limit according to the contract, the Control Function signals the subscriber that the record cannot be entered.

When the subscriber closes the session with the database, the Control Function compiles a list of the changes made, and conveys 305 this list to a notification function 120D, along with the one or more unique identifiers of mobile UEs associated with the mobile UE involved in the changes made. The notification function subsequently pushes 306 the list with changes to the mobile UEs identified by the Control Function.

The pushing 306 occurs in an appropriate way, e.g. with a Short Message Service (SMS) to a SIM-UE 101, or an operator's push notification server (interface 'network service provider' (NSp)) to a SIM-UE or to a non-SIM UE.

The notification push function is also applied to notify a subscriber with operator or contract related issues, such as a lapse of a period or payment reminders.

FIG. 6A is a block diagram illustrating an embodiment of an entity. FIG. 6A depicts the internal structure of a mobile UE 101, 102 for a setup of an enhanced call via a Wireless Local Area Network (WLAN) 110.

Mobile UE 101, 102 comprise a memory 602 arranged for storing program instructions, settings, configuration data and variables. The processor 601 controls, under the program instructions stored in the memory, the modules;

A Location retriever 605, such as a GPS module, which might be optional when other means are present to define a geographical location;

A display 606 for presenting status and results and control elements;

A User entry 603 for manually entering command or responses, the user entry might be combined with the display. The user entry comprises preferably a button which is dedicated for calling an emergency centre;

An identifier unit 610, implemented in a SIM-UE 101 as e.g. a SIM card comprising an IMSI, and for a non-SIM UE 102 as e.g. a MAC address;

An optional location calculator 604, to calculate an average of the geographical location in latitude and longitude of multiple retrieved geographical locations associated with identifiers of WLANs;

A WLAN detector 602A to detect unique identifiers of WLANs in coverage of the mobile UE;

An optional Private data memory 609 for storing data private to the user of the mobile UE, and accessible only by a pre-programmed B-party, and A call setup request composer 608, arranged to fetch geographical location information either based on the location retriever 605 or the WLAN detector 602A in a combination with access to a WLAN database 115B to retrieve the geographical location of a WLAN 110. Wherein the call setup composer is arranged to compose a call setup request comprising geographical location information and the identifier identifying the calling mobile UE, and submit the composed message as a call setup request. The call setup request may also comprise an IP address and port-number for providing the information of the Private data memory 609.

The UE further comprises an Input/Output module 607 arranged to communicate wirelessly, in case of a SIM-UE 101 with the WLAN 607A and the public mobile telecommunication network 607B, and in case of a non-SIM UE 102 with the WLAN 607A.

The Location retriever and WLAN detector are mutually optional.

FIG. 6B is a block diagram illustrating an embodiment of an entity. FIG. 6B depicts the internal structure of a mobile UE 101, 102 for a setup of an enhanced call via a Wireless Local Area Network (WLAN) 110.

Mobile UE 101, 102 comprise a memory 602 arranged for storing program instructions, settings, configuration data and variables. The processor 601 controls, under the program instructions stored in the memory, the modules internal to the mobile UE.

The UE further comprises an Input/Output module 607 arranged to communicate wirelessly, in case of a SIM-UE 101 with the WLAN 607A and the public mobile telecommunication network 607B, and in case of a non-SIM UE 102 with the WLAN 607A.

FIG. 7A is a block diagram illustrating an embodiment of an entity. FIG. 7A depicts the internal structure of a Control Function 120C comprised by the communication node 120 for a setup of an enhanced call via a Wireless Local Area Network (WLAN) 110.

Control Function 120C comprises a memory 702 arranged for storing program instructions, settings, configuration data and variables. The processor 701 controls, under the program instructions stored in the memory, the modules;

Call setup request receiver 705, for receiving a call setup request from the Packet data Gateway 120A;

Location detector 706 for detecting geographical location data in the call setup request;

Database Query 708, for querying the database 127, e.g. in case of checking whether the call setup request is allowed to be forwarded to the communication network, based on the identity of the mobile UE making the call setup request;

User access checker 709, for checking whether the change attempts made by a subscriber in the user accessible database are allowed;

an optional Name retriever 703 to fetch the name from the database in case the mobile UE is a non-SIM UE of the name associated with the associated SIM-UE, or in case the mobile UE is a SIM-UE 101, the associated name;

a Country(or State or Area) analyser 710 to provide information in the P.ANI SIP header regarding the country where the B-party has to be called, and Call request forwarder 704, arranged for forwarding the call setup request to the communication network wherein the call request comprises:

Geographical location information expressed in latitude and longitude or an address with State, County, Town, Postal code, street Number;

An identifier identifying the calling mobile UE;

Optionally, an IP address and port number of the mobile UE or other information source;

A Country, Area or State, depending on the coverage of an emergency centre, and

Preferably a name of the person associated with the calling mobile UE.

Additionally the Control function has an Interface module 707, 707A to receive and transmit messages to the other functions in the communication node 120.

FIG. 7B is a block diagram illustrating an embodiment of an entity. FIG. 7B depicts the internal structure of a Control Function 120C comprised by the communication node 120 for a setup of an enhanced call via a Wireless Local Area Network (WLAN) 110.

Control Function 120C comprises a memory 702 arranged for storing program instructions, settings, configuration data and variables. The processor 701 controls, under the program instructions stored in the memory, the modules internal to the control function.

Additionally the Control function has an Interface module 707, 707A to receive and transmit messages to the other functions in the communication node 120.

Figure 8:
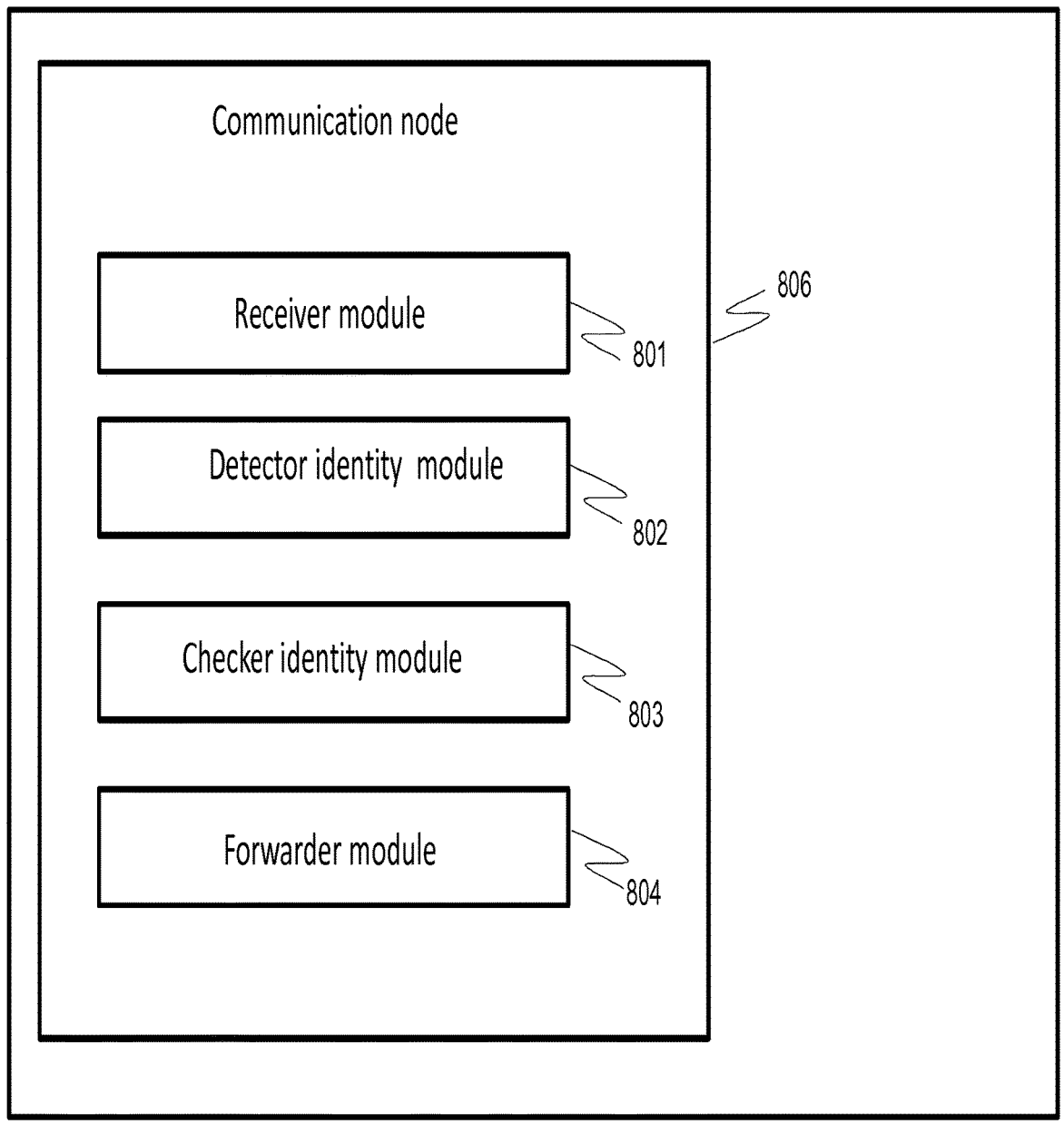
FIG. 8 is a block diagram illustrating an embodiment of modules.

FIG. 8 is a block diagram illustrating an embodiment of modules. FIG. 8 depicts the modules residing in the Communication node 120, 806.

The receiver module 801 is arranged to receive a call setup request initialized by the mobile UE 101, 102.

The detector identity module 802 is arranged to detect an IMSI or MAC address in the call setup request.

The Checker identity module 803 is arranged to check the identity provided in the call setup request, against identities associated with UEs allowed using services of the operator, in records of the database 127. The identities associated with either records representing a SIM-UE 101 or a non-SIM UE 102.

The forwarder module 804 is arranged to forward a call setup towards the communication network 130 in case the checker identity module yielded a positive result.

The solution provided, offers an advantage for public mobile telecommunication operators, as the solution represents technical means to provide services to subscribers that fully apply the possibilities of existing WLAN coverage, and at the same time public telecommunications would be offloaded.

Furthermore subscribers would advantageously be enabled to apply multiple mobile UEs with or without public telecommunication capabilities, generally offering the same services with the same user experience on SIM-UEs and non-SIM UEs.

The public mobile telecommunication operator is offered with an advantageous policy deployment tool, which enables a control of the use services by non-SIM UEs. The Control Function can e.g. be arranged to provide non-SIM UEs having a specific MAC range, such as tablets provided by the operator, with an extra suite of services.

A subscriber is furthermore advantageously supplied with a method of setting up an enhanced call wherein preferably his/hers name is provided to an emergency centre, enabling the centre to check associated databases for e.g. medical assistance.

A subscriber is furthermore advantageously supplied with means to provide private data to a trusted party, where the private data is stored locally to the UE, e.g. in an emergency situation.

A subscriber is advantageously offered with a flexible tool to maintain telecommunication access to multiple non-SIM UEs in a straightforward way.

A subscriber is advantageously offered with notification on e.g. lapsing contracts, changes made on one of the subscriber's UEs.

A subscriber might be aware of a single emergency number in his/hers own country, e.g. 911. But when the subscriber resides currently in the UK and the subscriber is not aware that the UK emergency number is 999, a number translation might advantageously be performed.

The solution as described provides the advantage for a subscriber that a call to an emergency centre is equipped with geographical location information, independent whether the calling mobile UE is a SIM-UE or non-SIM UE, thereby satisfying national law in a number of countries.

The invention claimed is:

1. An enhanced call setup method in a network comprising a Wireless Local Area Network (WLAN), a first User Equipment (UE), a communication node, and a communication network that are communicatively coupled, wherein the first UE operates in the WLAN and has a capability to setup a call via the WLAN, the method comprising:
the first UE retrieving a geographical location information representing its geographical location;
the first UE providing a first identifier identifying the first UE and the geographical location information in a call setup request to the communication node via the WLAN;
the communication node determining whether the identifier identifying the first UE is included in a record in a database that is accessible to a user of the first UE; and
based on determining that the identifier identifying the first UE is included in a record in the user-accessible database, the communication node performing the following operations:
adding information from the user-accessible database to the call setup request, wherein the added information is associated with the record that includes the identifier identifying the first UE; and
subsequently forwarding the call setup request to the communication network, thereby enabling a call-setup establishment with the geographical location information of the first UE.

2. The method according to claim 1 further comprising checking whether a list of conditions is fulfilled, in order to allow the forwarding of the call setup request.

3. The method according to claim 1, wherein:
the first UE has the capability to operate in a wireless public telecommunication network associated with the first identifier;
the user-accessible database includes a first record including the identifier identifying the first UE; and
the information added to the call setup request is included in the first record.

4. The method according to claim 1, wherein:
the first UE does not have the capability to operate in a wireless public telecommunication network;
the user-accessible database includes:
a first record including the identifier identifying the first UE,
a second record including an identifier identifying a second UE that has the capability to operate in the wireless public telecommunication network, and
an association between the first record and the second record; and
the information added to the call setup request is included in the second record.

5. An enhanced call setup method in a communication node communicatively coupled to a Wireless Local Area Network (WLAN), a communication network, and a first User Equipment (UE) having a capability to setup a call via the WLAN, the method comprising:
receiving a call setup request from the first UE via the WLAN, the call setup request comprising a first identifier identifying the first UE, and geographical location information representing the geographical location of the first UE;
determining whether the first identifier identifying the first UE is included in a record of a database that is accessible to a user of the first UE; and
performing the following operations based on determining that the identifier identifying the first UE is included in a record of the user-accessible database:
adding information from the user-accessible database to the call setup request, wherein the added information is associated with the record that includes the identifier identifying the first UE; and
subsequently forwarding the call setup request to the communication network, thereby enabling a call-setup establishment with the geographical location information of the first UE.

6. The method according to claim 5 wherein the call setup request comprises a Session Initiation Protocol (SIP) INVITE message, and wherein the geographical location information is forwarded towards the communication network in a P-Access Network Info (PANI) header of the SIP INVITE message.

7. The method according to claim 5 wherein:
the first UE has the capability to operate in a wireless public telecommunication network;
the user-accessible database includes a first record including the first identifier identifying the first UE; and
the information added to the call setup request is included in the first record.

8. The method according to claim 5 wherein:
the first UE has no capability to operate in a wireless public telecommunication network;
the user-accessible database includes:
a first record including the first identifier identifying the first UE,
a second record including an identifier identifying a second UE that has the capability to operate in the wireless public telecommunication network, and an association between the first record and the second record; and the information added to the call setup request is included in the second record.

9. A network operable to set an enhanced call via a Wireless Local Area Network (WLAN), the network comprising the WLAN, a communication node, a communication network, and a first user equipment (UE) that are communicatively coupled, wherein:

the first UE is configured:
with a capability to setup a call via the WLAN;
to retrieve a geographical location information representative for the geographical location of the first UE; and
to provide the geographical location information and a first identifier identifying the first UE in a call setup request to the communication node via the WLAN; and the communication node is configured to:
determine whether the first identifier identifying the first UE is included in a record of a database that is accessible to a user of the first UE; and
perform the following operations based on determining that the identifier identifying the first UE is included in a record in the user-accessible database:
add information from the user-accessible database to the call setup request, wherein the added information is associated with the record that includes the identifier identifying the first UE; and
subsequently forward the call setup request to the communication network, such that a call-setup establishment with geographical location information of the first UE is enabled.

10. The network according to claim 9, wherein:
the first UE is further configured with a capability to operate in a wireless public telecommunication network, associated with the first identifier;
the user-accessible database includes a first record including the first identifier identifying the first UE; and
the information added to the call setup request is included the first record.

11. The network according to claim 9, wherein:
the first UE is further configured with no capability to operate in a wireless public telecommunication network;
the user-accessible database includes:
a first record including the first identifier identifying the first UE,
a second record including an identifier identifying a second UE that has the capability to operate in the wireless public telecommunication network, and
an association between the first record and the second record; and
the information added to the call setup request is included in the second record.

12. A first User Equipment (UE) operable to setup an enhanced call via a Wireless Local Area Network (WLAN) that is communicatively coupled to a communication node and a communication network, the first UE having no capability to operate in a wireless public telecommunication network, and the first UE comprising:
at least one processor; and
at least one memory storing computer-executable instructions that, when executed by the at least one processor, configure the first UE to:
access a database to create a first record and an association between the first record and a second record of the database, wherein:
the first record includes an identifier identifying the first UE, and
the second record includes an identifier identifying a second UE that has the capability to operate in the wireless public telecommunication network;
retrieve a geographical location information representing the geographical location of the first UE; and
transmit, to the communication node via the WLAN, a call setup request comprising the geographical location information and the identifier identifying the first UE.

13. The first UE of claim 12, wherein:
the call setup request comprises a Session Initiation Protocol (SIP) INVITE message; and
the geographical location information is included in a P-Access Network Info (PANI) header of the SIP INVITE message.

14. A communication node operable for an enhanced call setup via a Wireless Local area Network (WLAN), the communication node communicatively coupled to the WLAN, a communication network, and a first User Equipment (UE) that has a capability to setup a call via the WLAN, wherein the communication node comprises processing circuitry configured to:
receive a call setup request from the first UE via the WLAN, the call setup request comprising an identifier identifying the first UE and geographical location information representing the geographical location of the first UE;
determine whether the identifier identifying the first UE is included in a record in a database that is accessible to a user of the first UE;
perform the following operations based on determining that the identifier identifying the first UE is included in a record in the user accessible database:
add information from the user-accessible database to the call setup request, wherein the added information is associated with the record that includes the identifier identifying the first UE; and
subsequently forward the call setup request to the communication network, thereby enabling a call-setup establishment with the geographical location information of the first UE.

15. The communication node of claim 14, wherein the processing circuitry is further configured to check whether a list of conditions is fulfilled, in order to allow the forwarding of the call setup request.

16. The communication node of claim 14, wherein:
the first UE has the capability to operate in a wireless public telecommunication network associated with the first identifier;
the user-accessible database includes a first record including the first identifier identifying the first UE; and
the information added to the call setup request is included in the first record.

17. The communication node of claim 14, wherein:
the first UE does not have the capability to operate in a wireless public telecommunication network;
the user-accessible database includes:
a first record including the first identifier identifying the first UE,
a second record including an identifier identifying a second UE that has the capability to operate in the wireless public telecommunication network, and an association between the first record and the second record; and the information added to the call setup request is included in the second record.

18. The communication node of claim 14, wherein:

the call setup request comprises a Session Initiation Protocol (SIP) INVITE message; and the geographical location information is included in a P-Access Network Info (PANI) header of the SIP INVITE message.

\* \* \* \* \*